US008305992B2

(12) United States Patent
Trossen (10) Patent No.: US 8,305,992 B2
(45) Date of Patent: Nov. 6, 2012

(54) PROACTIVE SEAMLESS SERVICE PROVISIONING IN MOBILE NETWORKS THROUGH TRANSFERRING OF APPLICATION CONTEXT

(75) Inventor: Dirk Trossen, Cambridge, MA (US)

(73) Assignee: Intellectual Ventures I LLC, Wilmington, DE (US)

( * ) Notice: Subject to any disclaimer, the term of this patent is extended or adjusted under 35 U.S.C. 154(b) by 925 days.

(21) Appl. No.: 12/127,929

(22) Filed: May 28, 2008

(65) Prior Publication Data

US 2008/0225798 A1    Sep. 18, 2008

Related U.S. Application Data

(63) Continuation of application No. 10/414,479, filed on Apr. 16, 2003, now Pat. No. 7,388,851.

(60) Provisional application No. 60/375,412, filed on Apr. 26, 2002, provisional application No. 60/375,414, filed on Apr. 26, 2002.

(51) Int. Cl.
*H04W 4/00* (2009.01)
*H04W 36/00* (2009.01)
*H04L 12/28* (2006.01)
*G06F 15/16* (2006.01)
*G06F 15/173* (2006.01)

(52) U.S. Cl. ........ 370/331; 370/338; 370/351; 455/436; 709/203; 709/226; 709/227

(58) Field of Classification Search .......... 370/316–328, 370/331, 338, 351; 455/414–432, 436; 709/203, 709/226–227
See application file for complete search history.

(56) References Cited

U.S. PATENT DOCUMENTS

| 5,920,705 | A  | * | 7/1999  | Lyon et al. ................ 709/240 |
|-----------|----|---|---------|-------------------------------------|
| 6,137,783 | A  | * | 10/2000 | Sallberg ..................... 370/316 |
| 6,438,123 | B1 | * | 8/2002  | Chapman ................... 370/351  |
| 6,470,447 | B1 | * | 10/2002 | Lambert et al. ............. 713/151 |
| 6,636,491 | B1 | * | 10/2003 | Kari et al. .................. 370/328 |

(Continued)

FOREIGN PATENT DOCUMENTS

EP    1 189 405    3/2002

(Continued)

OTHER PUBLICATIONS

Caceres et al., "Fast and scalable wireless handoffs in support of mobile Internet audio", Mobile Networks and Applications 3 (1998), p. 351-363.*

(Continued)

*Primary Examiner* — Alpus H Hsu
*Assistant Examiner* — Yee Lam (57) ABSTRACT

A method supporting relocation of an Internet Protocol session during a network layer handover is provided. Application context information is sent to a device. The application context information indicates activities to be executed pro-actively before a network layer handover and includes a requested communication requirement. A first message is received from the device that includes a first indicator indicating whether or not the device can satisfy the requested communication requirement. If the first indicator indicates that the device cannot satisfy the requested communication requirement, the application context information is sent to another device, and a second message is received from the other device. The second message includes a second indicator indicating whether or not the other device can satisfy the requested communication requirement. If the second indicator indicates that the other device can satisfy the requested communication requirement, the other device is selected as a target access router for the network layer handover.

22 Claims, 3 Drawing Sheets

U.S. PATENT DOCUMENTS

| | | | |
|---|---|---|---|
| 6,731,932 B1 * | 5/2004 | Rune et al. | 455/432.1 |
| 6,904,025 B1 * | 6/2005 | Madour et al. | 370/328 |
| 7,050,793 B1 * | 5/2006 | Kenward et al. | 455/414.4 |

FOREIGN PATENT DOCUMENTS

| | | |
|---|---|---|
| WO | WO 03/003139 | 1/2003 |

OTHER PUBLICATIONS

"Policy Based Access Router Selections and Context Transfers in Mobile IP," Gopal et al., Paris, France, Oct. 23-25, 2002, Network Control and Engineering for QoS, Security and Mobility. IFIP TC6/WG6.7 Conference on Network Control and Engineering for QoS, Security and Mobility (Net-Con 2002).

"QoS Support in Mobile IP version 6", Chaskar et al., May 2001, IEEE Broadband Wireless Summit (Networld+Interop 2001).

"A study of profile handoff for DiffServ-based mobile nodes", Jaseemuddin et al., Wirel. Commun. Mob. Comput. (UK), Wireless Communications and Mobile Computing, Jun. 2002.

"A model for proactive seamless IP mobility and mobility-hop routing", Pagtzis et al., Proceedings 10$^{th}$ IEEE International Conference on Networks (ICON 2002). Towards Network Superiority (Cat. No. 02EX588). Proceedings 10$^{th}$ IEEE International Conference on Networks (ICON 2002). Towards Network Superiority Singapore, Aug. 27-30, 2002.

IETF Seamoby Working Group Internet Draft, "Candidate Access Router Discovery," Liebsch et al, Oct. 2002.

IETF Seamoby Working Group Internet Draft, "A Dynamic Protocol for Candidate Access-Router Discovery," Trossen et al., Oct. 2002.

International Search Report for PCT/FI 03/00320, mailed Jul. 25, 2003.

Extended Search Report for European Patent Application 10166952.1, dated Sep. 9, 2010.

Koodli R., et al., "Fast Handovers and Context Transfers in Mobile Networks," Computer Communication Review, vol. 31, No. 5, Oct. 2001, pp. 37-47.

Mahmoodian A., et al., "A Resource Allocation Mechanism to Provide Guaranteed Service to Mobile Multimedia Applications," IEEE/POPOV Workshop on Internet Technologies and Services, Oct. 25, 1999, pp. 9-17.

The International Preliminary Report on Patentability for PCT/FI2003/000320 completed on Jun. 24, 2004.

The Communication for EP Application Serial No. 03 722 622.2 dated Jun. 1, 2007.

* cited by examiner

PROACTIVE SEAMLESS SERVICE PROVISIONING IN MOBILE NETWORKS THROUGH TRANSFERRING OF APPLICATION CONTEXT

CROSS-REFERENCE TO RELATED APPLICATIONS

This application is a continuation of U.S. patent application Ser. No. 10/414,479, filed Apr. 16, 2003, which claims the priority of U.S. Provisional Patent Application Ser. No. 60/375,412, entitled "COUPLING OF TARGET ACCESS ROUTER SELECTION WITH THE SUCCESS OF RESOURCE ALLOCATION AT THE POTENTIAL CANDIDATE," filed on Apr. 26, 2002, and of U.S. Provisional Patent Application Ser. No. 60/375,414, entitled "PROACTIVE SEAMLESS SERVICE PROVISIONING IN MOBILE NETWORKS THROUGH REGISTERING AND TRANSFERRING OF APPLICATION CONTEXT IN A PROACTIVE-COMMITTING MANNER," filed on Apr. 26, 2002, the contents of which are hereby incorporated by reference.

FIELD

The present invention relates to mobile communication, and especially to a method for supporting a relocation of an IP session during a network layer handover in a mobile communication system, and a mobile node and a network node supporting the method.

BACKGROUND

A mobile communications system refers generally to any telecommunications system wherein the access point to the system may change when users move within the service area of the system. The mobile communications network is, correspondingly, an access network providing an end user with wireless access to external networks, hosts, or services offered by specific service providers. The service area of the system may comprise different access technologies and several administrative domains.

The new mobile communication systems have been developed to facilitate widespread use of new applications, also including ones that require more bandwidth and extended transmission sessions compared to earlier technologies. On the other hand, the ubiquitous coverage of current cellular systems has led the end users to expect similar availability of services from the next generations of systems. Therefore, seamless service provisioning for the considerable range of different applications will be a critical issue for the success of the new mobile communication systems.

In the context of providing wireless access using the Internet Protocol (IP), seamless IP layer mobility refers to the ability to hand over a mobile node (MN) to a new access router (AR) with minimal disruption to the IP connectivity. In the auspices of the Internet Engineering Task Force (IETF), a number of solutions for seamless IP layer mobility have been generated. Mobile IP, as defined in Request for Comments (RFC) 2002, is an enhancement of the Internet Protocol version 4 (IPv4) that adds mechanisms for forwarding Internet traffic to mobile nodes when they are connecting through a network other than their home network. Similar mechanisms have been developed for Internet Protocol version 6, referred to as IPv6. Each mobile node is assigned a permanent home address on its home network and a care-of address that identifies the current location of the device within a network and its subnets. Each time a mobile node moves to a different network, it acquires a new care-of address. A mobility agent (also known as Home Agent) on the home network associates each permanent address with its care-of address.

As an enhancement to this, fast handover protocol allows a mobile node to configure a new care-of-address before it moves towards a new subnetwork with the aim of being able to use it directly after its connection to the new access router. Consequently, the latency time is minimized and potential loss of packets during handoff is effectively eliminated.

In the process of establishing the new forwarding path for IP flows, mere creation of connection to the new nodes, however, might not be enough. The nodes along the new path must be prepared to provide similar forwarding treatment to the IP packets. This is especially important for services with particular requirements, such as time sensitive VoIP telephony and video and streaming services, whose successful employment in mobile environment depends heavily upon the ability to minimize the impact of the traffic redirections. A context transfer procedure is a specified method, which aims at provisioning of seamless IP layer connectivity. Context relates to the information transferred from one network entity to another as a means of reestablishing routing related services on a new subnet or a group of subnets. Context transfer thus facilitates seamless transfer of the mobile node's (also known as mobile terminal, station or device) packet session a the new access router while the session can be re-established without having to perform the entire protocol exchange between the new node and the mobile node.

In order to perform fast handover and context transfer procedures as described above, the Candidate Access Router Discovery (CARD) as described in the IETF Seamoby Working Group Internet Drafts "Candidate Access Router Discovery" of October 2002, and "A Dynamic Protocol for Candidate Access Router Discovery" of October 2002, provides means for discovering the IP addresses of the potential next access routers, and such characteristics of the access routers that may be of interest to an MN when the access router is evaluated as a handover candidate. Through this potential next access router discovery (CARD), at the time of the IP layer handover the potential next access router whose capabilities appropriately match with the requirements of the mobile node may be selected as a target access router. For enhancing the established CARD solution, a protocol for maintaining and updating the information on capabilities of the neighboring access routers in each of the access routers has also been proposed in the prior art.

However, even though the presented mechanisms allow the mobile node to be able to immediately exchange packets with the new network node and even transfer a session to a new access router without interruption, there are cases where the mobile node may still not be able to continue the service without disruption after the handoff. This is due to the fact that the existing solutions are designed to reveal the existence of a requested capability in the new access router, but they do not disclose whether the pre-discovered resource is available to the transferable session at the time of the handoff. Such temporary lack of appropriate resources is imminent, however, whenever the application requires a specific functionality of a network node, and the successful execution of the application functionality does not allow for breaks in the data transfer.

For example, let us consider a user of a mobile node MN1 moving along a road and utilizing a streaming application with a specific bandwidth. Through the specified potential next access router discovery the capability of the selected target access router to support said bandwidth may be verified. However, before the initiation of the network layer handover of the mobile node MN1, another mobile node MN2 may have already been handed off to the selected target access router, and the resulting available bandwidth in the access router is lower than what is necessary for a successful continuation of the ongoing session in the mobile node MN1. The result of such a situation is degradation or even teardown of the session of MN1 at handover.

As another example, let us consider a user of a mobile node moving along a certain road, and crossing a sequence of access routers and administrative domains. Somewhere along this route the user may also need to cross a technology boundary from 2 G to 3 G, which means that a specific transcoding functionality is needed because of the different bandwidth capabilities of the traversed networks. However, it is possible that at the time of the actual handover the transcoding functionality is no longer available for the mobile node. It is also possible that the discovery of the transcoding element may take too much time for the relocation to happen without disruption. In such a case, the handoff will severely disrupt the active service.

In view of the above, in addition to the comprehensive measures for IP layer mobility and connectivity, a solution for enhancing the seamless relocation of an IP session of a mobile node during a network layer handover is desirable.

SUMMARY

In an exemplary embodiment, a method for supporting relocation of an internet protocol session during a network layer handover is provided. The method includes sending application context information from a first device to a second device. The application context information indicates activities to be executed pro-actively before a network layer handover and includes a requested communication requirement. A first message is received from the second device at the first device. The first message includes a first indicator indicating whether or not the second device can satisfy the requested communication requirement. If the first indicator indicates that the second device cannot satisfy the requested communication requirement, the application context information is sent from the first device to a third device, and a second message is received from the third device at the first device. The second message includes a second indicator indicating whether or not the third device can satisfy the requested communication requirement. If the second indicator indicates that the third device can satisfy the requested communication requirement, the third device is selected as a target access router for the network layer handover.

In another exemplary embodiment, a device for supporting relocation of an interact protocol session during a network layer handover is provided. The device includes, but is not limited to, an output interface, an input interface, and a processor operably coupled to the output interface and the input interface and configured to execute a computer-readable program. The output interface is configured to send application context information to a second device. The application context information indicates activities to be executed pro-actively before a network layer handover and includes a requested communication requirement. The input interface is configured to receive a first message from the second device. The first message includes a first indicator indicating whether or not the second device can satisfy the requested communication requirement. The computer-readable program is configured to cause the device to determine if the second device can satisfy the requested communication requirement based on the first indicator; if the second device cannot satisfy the requested communication requirement, to send the application context information to a third device and to receive a second message from the third device, the second message including a second indicator indicating whether or not the third device can satisfy the requested communication requirement; to determine if the third device can satisfy the requested communication requirement based on the second indicator; and if the third device can satisfy the requested communication requirement, to select the third device as a target access router for the network layer handover.

In yet another exemplary embodiment, a computer-readable memory including a computer-readable program for supporting relocation of an internet protocol session during a network layer handover is provided. Upon execution by a processor, the computer-readable program causes a device to send application context information to a second device, the application context information indicating activities to be executed pro-actively before a network layer handover and including a requested communication requirement; to receive a first message from the second device, the first message including a first indicator indicating whether or not the second device can satisfy the requested communication requirement; if the first indicator indicates that the second device cannot satisfy the requested communication requirement, to send the application context information to a third device and process a second message received from the third device, the second message including a second indicator indicating whether or not the third device can satisfy the requested communication requirement; and if the second indicator indicates that the third device can satisfy the requested communication requirement, select the third device as a target access router for the network layer handover.

BRIEF DESCRIPTION OF THE DRAWINGS

In the following, the invention will be described in greater detail by means of preferred embodiments and with reference to the attached drawings, in which.

DETAILED DESCRIPTION

Figure 1:
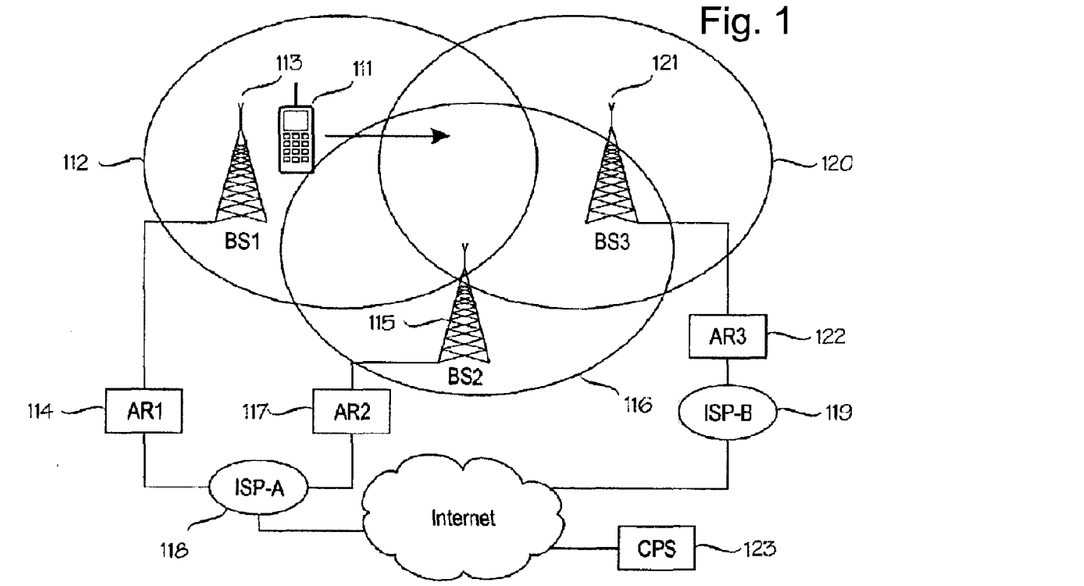
FIG. 1 shows a simplified system architecture that supports information transfer according to an embodiment of the invention.

The present invention can be applied to any mobile communication system providing packet data services for mobile nodes within a defined service area, and it can be embodied in various forms. FIG. 1 shows a simplified system architecture that supports information transfer according to an embodiment of the invention. Only basic parts of a mobile communication system 1 are illustrated; it is obvious to a person skilled in the art that the system 1 comprises numerous network nodes, functions and structures, which need not be described in greater detail herein.

The embodiment of the mobile communication system 100 of FIG. 1 shows a mobile node 111 in a current cell 112 of a current access point 113. The mobile node 111 can be an IP node that is capable of changing its point of attachment to the network. The access point 113 can be a device that provides an access link to the mobile node 111, typically a link layer (layer 2) device with a radio transceiver. The mobile node may be, for example, a laptop computer, mobile/cellular terminal, personal digital assistant or the like. In the illustrated embodiment, the access point 113 is a base station of the mobile communication system. The cell 112 covers a geographical area within which wireless communication between the access point 113 and the mobile node 111 is possible. A current access router 114 acts as an IP router for the current access point 113. One access router may be connected to one or more access points, and one access network comprises one or more access routers. An access point may be a separate physical entity or co-located with an access router. The mobile node 111 is attached to the current cell 112 but may be simultaneously communicating with access points of surrounding cells 116, 120 in order to be able to change its point of attachment whenever necessary or appropriate. A mobile node 111 travelling in the direction of the arrow, as shown in FIG. 1, will at some point of time enter the coverage of the first potential next cell 116 provided by a first potential next access point 115, and coverage of the second potential next cell 120, provided by a second potential next access point 121. A more detailed functional description of a mobile node and of a network node is given with reference to FIGS. 8 and 9.

In the embodiment of FIG. 1, the current access router 114 is thus connected to the current access point 113. The current access router 114 and the first potential next access router 117 are included in the access network of the current administrative control (ISP-A) 118. A collection of networks under the same administrative control, grouped together for administrative purposes, can constitute one administrative domain. For clarity's sake, only some of the network elements for describing the embodiment in one access network for the administrative domains are shown. It is clear that an administrative domain may comprise several networks that may implement different access technologies, and each access network may comprise a plurality of network elements not shown in the drawing. The second potential next cell 120 is part of another administrative domain, controlled by a second administrative control (ISP-B) 119. A person of ordinary skill in the art would be able to make and use the invention based on the information contained herein.

The point of attachment of the mobile node 111 can be defined with an IP address. Each mobile node 111 is assigned a home address, and according to the need, one or more care-of-addresses. The home address is an IP address permanently assigned to a mobile node and stored in the home network. When the mobile node is not attached to the home network, the incoming datagrams destined to the mobile node are encapsulated and sent from the home network to the care-of address of the mobile node. In mobile IPv6, mobile nodes may be identified with a home address stored by its home agent.

A packet data connection between users or between users and applications during which data can be transferred between the participants is called a session. In the embodiment of FIG. 1, the mobile node 111 has a session with an application server 123 for data transfer related to a defined communication application. A session can include transmission of any type of data, for example, voice or video data. The mobile nodes may have several simultaneous connections to different service applications.

A network layer handover provides a procedure by which the mobile node 111 can change its point of attachment to the network. When the mobile node 111 changes its point of attachment from the current access point 113 to another access point connected to the same current access router 114 a network layer (layer 2) handover occurs, which is transparent to the routing at the IP layer. When the mobile node 111 changes its point of attachment from the current access point 113 to another access point 121 connected to another access router 122, also an IP layer handover occurs, preferably as defined by the Mobile IP of the IETF. In one embodiment, the present invention relates to a method and apparatus for minimizing the interference by the IP layer handover at the network layer handover to the ongoing session between the mobile node 111 and the application server 123.

While the mobile node 111 is in the current cell 112 of the current access point 113 of the current access router 114, the access routers 117, 122, serving the potential next access points 115, 121 of the potential next cells 116, 120, are potential next access routers for the mobile node for to performing an IP level handover. The mobile node 111 can support the wireless interface of the potential next access points 115, 121 connected to the potential next access routers 117, 122 and the coverage of the access points 115, 121 of the potential next access routers (here the cells 116, 120) can overlap with the coverage of the current access router 114 (here cell 112). The potential next access router discovery (CARD), for example as specified in the IETF document D. Trossen et al., "A Dynamic Protocol for Candidate Access Router Discovery", Work In Progress, IETF Internet Draft, October 2002, describes a procedure for identifying the potential next access routers, and also discovering the characteristics of their offered services when considered as a handoff candidate. Based on the information thus available, a group of candidate access routers may be selected, and one of which may be further selected as a target access router (TAR). The selection of TAR typically takes into account the capabilities of potential next access routers, preferences of the mobile node and potential local policies. The invention relates to with information transfer facilitating the selection, and thus the TAR selection as such, does not fall in the scope of the invention.

In the embodiment of FIG. 1, assume that a user carrying the mobile node 111 is moving in the direction of the arrow. The mobile node is engaged to a session with an application server 123 for an ongoing application that requires special services from the mobile network. The special services may relate to any feature or functionality facilitated by a specific access router, for example quality of service for transmission, security level, header compression, availability of transcoding service element, etc. Thereby, for example, the downlink data packets are flowing from the application server 123 through the serving access router 114 under the first administrative control 118 to the serving access point 113, and linked over the radio interface to the mobile node.

The radio access network comprises defined mechanisms for network level handover control. In order to prepare also for the coming IP level handover, the IP address of the potential next access routers 117 and 122 that connect to the potential next access points 115, 121 are identified. There are several possibilities for this reverse address translation. In some cases the AP beacon comprises the IP address of the access router the AP is connected to. In the prior art, mechanisms are also proposed for caching the mapping between the L2 addresses of the neighbouring access points and IP addresses of the access routers connected to them into dedicated network nodes. The choice of procedure for identifying the potential new access routers is not, as such, essential for the present invention.

Figure 2:
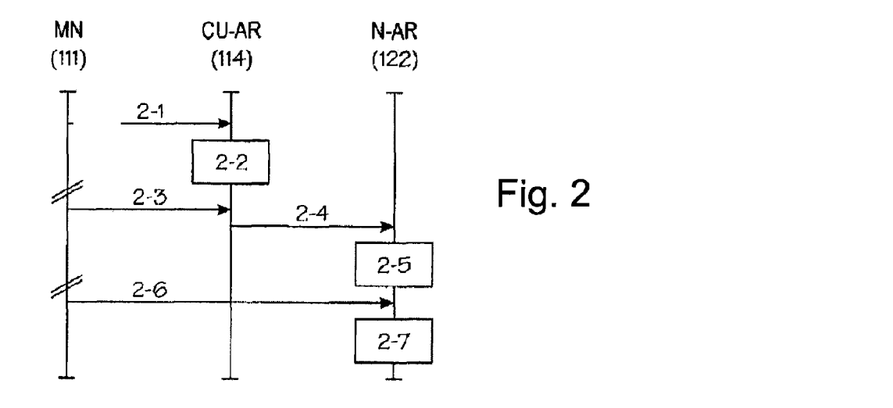
FIG. 2 shows a flow chart of information transfer according to an embodiment of the invention.

Referring to the flow chart of FIG. 2, at some point, for example a parameter defined point, before the network layer handover, the mobile node 111 generates application context information for the ongoing session with the application server 123. The application context information includes general information on the application semantics, possibly including information on the current state of the session. The application context information on the current state of the session facilitates re-establishment of the session on a new access router without having to re-perform the entire protocol exchange between the mobile node and the new access router. There are various possibilities for generating the application context. The application context information may, for example, be based on descriptive information on session description protocol in the session initiation protocol (SIP) messages between the mobile node 111 and the application server 123. The application context information is provided in a pre-defined format of information elements that allows it to be supported in access routers as well. The format may be according to a specified standard, as the ones recommended by the IETF. Examples of such standards comprise Distributed Component Object Model (DCOM), Simple Object Access Protocol (SOAP), Common Object Request Broker Architecture (CORBA), Enterprise Java Beans (EJB), and Type Length Value (TLV), Extensible Markup Language (XML).

The application context information is essentially generated in the mobile node, but it may also include information on the correspondent node of the mobile node. Some application functionality of the correspondent node of the mobile node may depend on the location of the mobile node, for example a web server that tailors the content of the delivered web page based on the location of the mobile user. In such a case, for maintaining an IP session, it might be necessary that the application context information includes such information on the correspondent node as well, preferably included in the same message generated by the mobile node.

It should be noted that the above-mentioned concept of application context information constitutes the framework of the application semantics, which is fundamental for the ongoing session between a mobile node and an application server. The application context information serves as a basis for extracting the required access router capabilities. In some cases, the application context information can be directly mapped onto the required access router capability information, and in some cases further processing is necessary. The procedure of deriving the necessity of a certain access router capability by the mobile node, from the application context information, is not as such essential for the invention.

Figure 3:
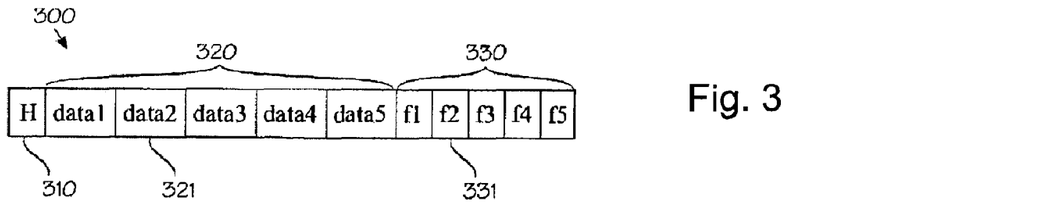
FIG. 3 shows a diagrammatic representation of application context information.

According to one example of the invention, part of the information in the dynamically generated application context information relates to such handover related procedures in the access router which, for seamless service, are advantageously performed pro-actively before the network layer handover. Advantageously in this context means that performing the defined procedures pro-actively is not mandatory, but improves the probability of successful relocation of the IP session at handover. Thus, the mobile node includes in the application context information a first indication that enables the access routers to identify the information elements of the application context information that relate to such pro-active procedures. The first indication may comprise, for example, flag bits that are associated with individual information elements of the application context information and which show whether the associated information element relates to a pro-active procedure or not. This is illustrated in FIG. 3, where a diagrammatic data block of application context information is illustrated. The data block 300 shows an optional header part 310 for header information that precedes the data, and a payload part 320 for carrying individual information elements data1, . . . , data 5 of the application context information. The information elements are essentially data fields of equal or different amounts of bits. The data block 300 also comprises a flag part 330, which comprises a group f1, f2, . . . , f5 of flag bits, each flag bit 331 of the flag part being associated with an information element 321 of the payload part 320. Various possible methods of formatting information comprising a plurality of information elements and indicating properties attached to them are obvious to a person skilled in the art.

In step 2-1 of FIG. 2, the mobile node 111 sends the application context information to the current access router 114. The sending takes place before the handover procedure is triggered, preferably timed such that several consecutive interactive signalling messages may be exchanged between the serving access router and its neighbouring nodes before the handover is triggered. The optimisation of timing is an implementation related issue that as such is not essential to the present invention. If the application context information is delivered very early before the handover takes place, there is a risk that the registered information becomes obsolete before it is used. On the other hand, if the time between the context transfer and the handover does not facilitate required procedures in the serving access node and the potential next access node, the success of seamless service may be at risk.

In step 2-2 of FIG. 2, the received application context information is stored in the current access router 114. In step 2-3, the mobile node 111 generates a triggering message for initiating the transfer of application context from the current access router 114 to a potential next access router 122. In this embodiment the two signals, the one (step 2-1) for delivering the application context information to the current access router 114, and the one (step 2-3) for triggering the application context information from the current access router 114 to one or more potential next access routers are shown as separate signalling events initiated by the mobile node 111. Furthermore, it is anticipated that the time elapsed between the two signalling events (2-1, 2-3) changes dynamically according to the state of the mobile node, i.e. it is dependent on the actual behaviour of the user, as well as on the implementation-specific settings of the network on how it is configured to respond to the behaviour of the user by its mobility management functionality. It is also possible that the two signals are combined, i.e. that the first signal (step 2-1) also acts as a trigger, and the application context information transfer from the current access router 114 is initiated in response of the received application context information from the mobile node 111.

The triggering message 2-3 thus acts as a request from the mobile node 111 to the serving access router 114 to forward a defined part of the application context information to the potential next access router 122. The format of the triggering message as such is not essential to the invention, for example appropriate Internet control message protocol (ICMP) messages or user datagram protocol (UDP) messages may be used. The triggering message preferably comprises an indication that allows the current access router 114 to identify the potential next access router 122, to which the application context information transfer should be addressed, typically by the IP address of the new access router. The mobile node 111 may send one triggering message addressing one potential next access router 122, or several triggering messages addressing a group of potential next access routers 117, 122. The mobile node 111 may also generate one combined triggering message that simultaneously addresses a group of access routers 117, 122.

In step 2-4, the current access router 114 transfers the application context information to the addressed new access router(s). The transferred information can comprise the whole application context information as delivered from the mobile node, or it can comprise a defined part of it. Essentially the transferred application context information comprises the information elements that relate to pro-active procedures which, for seamless service, need to be performed pro-actively before the actual IP handover.

In step 2-5, the potential next access router 122 analyses the received application context information and, based on the data in the information elements that relate to pro-active procedures, implements them. The necessity of the pro-active procedures may be explicitly indicated in the application context information, and/or the access router may be able to determine the necessity based on the received information. Examples of such pro-active actions include reservation of resources for a defined quality of service, reservation of a defined transcoding entity for the use of mobile node, initialization of defined authentication procedures, or contacting defined communication entities in preparation of the expected handover. These pro-active procedures can be implemented in access routers that receive the application context information, including information elements that relate to pro-active procedures. At this stage the mobile node has indicated an intent to perform an IP layer handover to the new access routed addressed by the triggering message.

In step 2-6, the mobile node 111 sends a commitment message to the potential next access router that has been selected as a next access router 122. This commitment message 2-6 acts as a confirmation of the intent that was earlier indicated in connection with step 2-4. The format of the commitment message 2-6 as such is not essential to the invention, for example appropriate Internet control message protocol (ICMP) messages or user datagram protocol (UDP) messages may be used. The commitment message to the selected next access router may be sent before or after the network layer handover, typically before the handover.

In step 2-7, the next access router 122 implements the handover actions still pending, essentially such handover procedures pending the actual commitment to the next access router which have not yet pro-actively been implemented. Depending on the specified content of the application context information, the division between the pro-active procedures and the procedures may be exclusive, or some procedures of the pro-active procedures may be implemented after commitment, or repeated at the time of commitment. The application context information for the pending handover procedures may already be available in the new access router if the complete context information was transferred in step 2-4. If only partial application context information was transferred in step 2-4, the next access router 122 needs to request the missing application context information from the current access router 114. To facilitate this, the mobile node 111 preferably includes the address of the serving access router 114 to the commitment message to the next access router 122. The next access router 122 requests necessary information from the current access router 114. The protocols and procedures of context access router 114. The protocols and procedures of context transfer as specified by the IETF can be utilized for pulling the information from the serving access router 114 to the new access router 122.

In the embodiment as described above, the division of handover activities facilitates timely performance of the necessary handover procedures to support seamless continuation of a service for an ongoing application. This reduces the possibility of failures that may otherwise appear, for example, due to the duration of some handover procedures, or due to a requested resource not being available at the time of handover. Correspondingly, the communication related to the application context transfer happens between the access routers, thus reducing the time and radio resource consuming communication over the air interface.

In FIG. 2, the line of MN is marked with slashes to indicate that the time between the steps may vary considerably from case to case. It is clear that if a mobile node is relatively stable, i.e. does not move much, the time between handovers is long, the periods between the steps of application context transfer, as shown, also being long. In these cases, a very predictive approach in timing the application context information transfer may end up in wasting resources in the pro-active reservation procedures, and/or the more dynamic part of the context information becoming obsolete before the actual handover. On the other hand, when a mobile node is moving fast, for example in a train, the consecutive steps need to follow each other very quickly.

Figure 4:
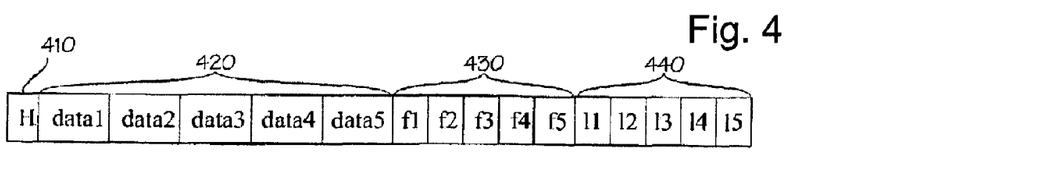
FIG. 4 shows a diagrammatic representation of alternative application context information.

In another embodiment of the invention, appropriate timing of the actions is facilitated by including in the application context information a second indication that enables access routers to determine the temporal validity of the context information. Such second indication may be implemented, for example, as illustrated with the diagrammatic representation of context information in FIG. 4. The header part 410, the payload part 420, and the flag part 430 of the data block 400 correspond with the parts of the data block 300 in FIG. 3. In addition to these, the data block 400 comprises a lifetime part 440 with lifetime information elements I1 . . . I5, each associated with the individual information elements data1 . . . data5 of the payload part 420 and comprising a sequence of bits to indicate the period of validity of the information in the information elements of the payload part 420. The lifetime information elements I1 . . . I5 may be utilized by the current access router 114 for determining whether the application context information to be transferred to the potential next access router 122 is still valid when the triggering message arrives. The lifetime information elements I1 . . . I5 may also be utilized by the potential next access router 122 for timing the duration of the pro-active action. If, for example, the potential next access router 122 does not receive a commitment message within the lifetime indicated by a defined lifetime element I2, the potential next access router 122 will release an allocated resource associated with the information element data2. Other possible applications of the lifetime information are apparent to a person skilled in the art.

Figure 5:
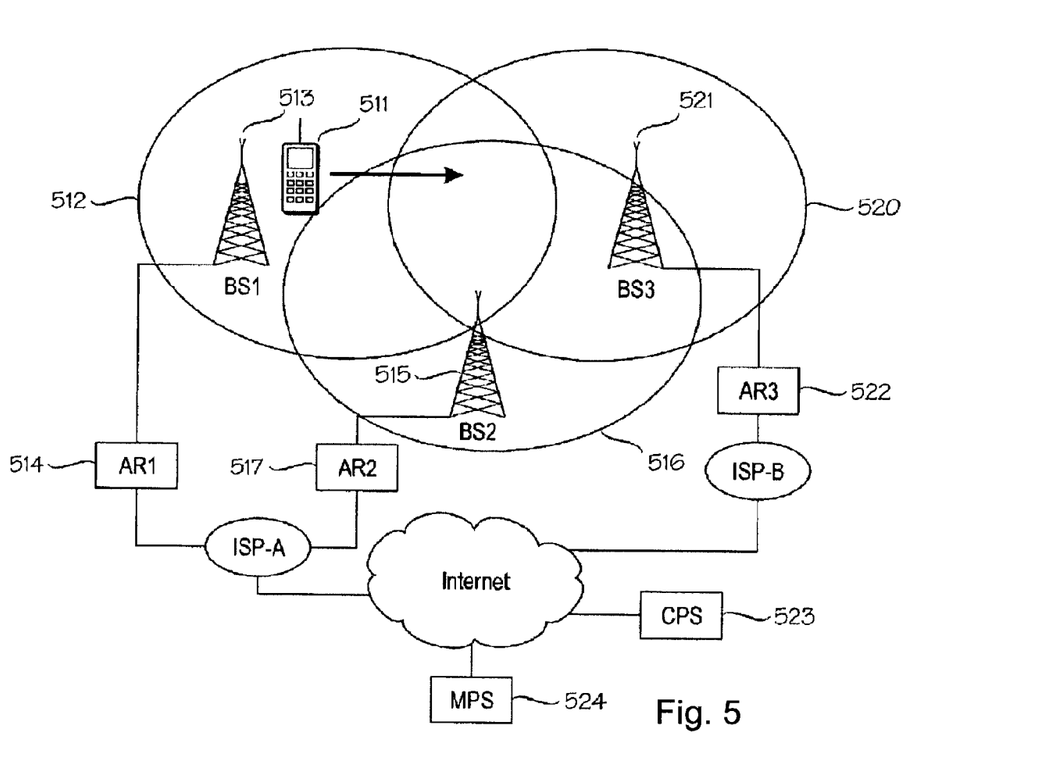
FIG. 5 shows a simplified system architecture according to another embodiment of the invention.

In the first embodiment, the mobile node 111 sends the application context information to the current access router 114. Another scenario for providing the information for disposal of the access routers is to arrange a source of application context information into the network side. This embodiment of the invention is illustrated in FIG. 5. The elements 511 to 523 of FIG. 1 correspond directly with the elements 111 to 123 of FIG. 1, and will not be re-described herein. According to the current embodiment, a mobile proxy server 524 is further connected to the mobile communication system. In FIG. 5, the connection of one mobile proxy server 524 is shown via the Internet. It is clear that the mobile communication system may comprise one or more such servers, and that a mobile proxy server 524 can also be located in any of the access networks of the mobile communication system. The mobile proxy server 524 can be a separate physical network element or it can be implemented as a logical unit integrated together within another network element.

The basic role of a mobile proxy server 524 in the context of this example of the present invention is to maintain updated personal information on the mobile user. An implementation of this is, for example, a server for executing advanced applications, targeted to facilitate providing of services that are chosen and/or tailored according to the current personal information of the mobile user. Such a mobile proxy server 524 is configured to collect static and dynamic information from various sources and, based on the dynamically changing personal status and context information of the mobile user, provides a defined service or defined services for the user. The collected information may, for example, comprise a user location, user profile input by the user himself or herself, background data retrieved via the Internet, monitoring data on the physical or emotional status of the user, status of the ongoing applications, etc. For example, let us consider that the application is configured to pull out information from a data source for user location information, a data source for event schedules, a data source for league information, and a data source for user monitoring data. Let us assume that the data source for location information indicates the mobile user to be in a football stadium, the data source for event schedules indicates a particular match to take place in the detected football stadium, the data source for league information facilitates listing all the other teams in the league that the particular match may concern and, additionally, user monitoring data that indicates that the user does not feel enthusiastic about the progress of the current game. Based on this information, the application may be configured to trigger a service where it retrieves clippings of goals and scores of the other simultaneously ongoing matches of that league, and offers them to the user.

In order to maintain relevant dynamic information in the mobile proxy server 524, the mobile node 511 transfers relevant application context information and monitoring information to the mobile proxy server 524. Between the mobile node 111 and the mobile proxy server 524 is a trust relationship, which means that appropriate security measures for ensuring the identity of the communicating parties and the integrity of the exchanged messages are taken in their mutual communication. Such measures may comprise authentication and encryption procedures, generally known to a person skilled in the art. Through this proxy arrangement, updated information for generating the application context information for a mobile node is made available in the network side, thus being available for the purpose of the invented solution.

Figure 6:
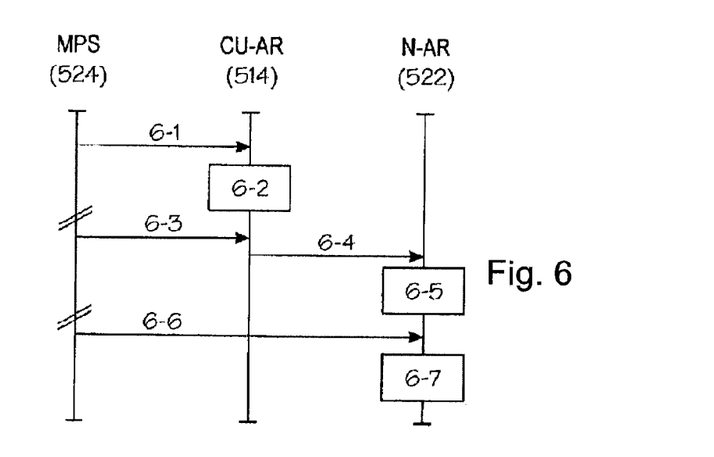
FIG. 6 shows a flow chart illustrating information transfer in the embodiment of FIG. 5.

Referring to FIG. 6, the actions as such are similar to the embodiment of FIG. 2, but the logical elements responsible for some individual actions may be different. The mobile proxy server 524 that, as disclosed above, now possesses updated context information, generates (step 6-1) the application context information on the mobile node 511. Since the generic trust relationship essentially exists only between the mobile proxy server 524 and the mobile node 511, necessary security measures need to be followed between the mobile proxy server 524 and the serving access router 514, at least to facilitate authentication of the source of application context information. Such security measures may comprise, for example, signing of the application context transfer message with the mobile node's private key in the mobile proxy server 524, and verification of the signature in the serving access router 514 with the mobile node's public key. Other applicable security measures are apparent to persons skilled in the art. In this embodiment, after the current access router 514 has received the application context information, the procedure continues as described in the first embodiment through steps 6-2 to 6-7. The triggering message 6-3 is preferably given by the mobile proxy server 524, and the commitment message 6-6 is preferably sent by the mobile node 511 itself.

A further advantage of this embodiment is that the activities for service relocation are allotted to the network side, thereby reducing the more critical communication over the air interface. By this embodiment, also the sensitivity of the handover operations due to a range of mobile node equipment communicating with an equally versatile range of potential next access routers is reduced which, especially in transition between generations of access technologies, is a clear advantage. A still further advantage of synergy is perceived with the application context information being transferred from the mobile node 111 to the mobile proxy server 524 for the purposes of the context-based applications as well.

In the previous embodiments, the application context transfer to the potential next access routers was distributed via the current access router 514. In a still further embodiment, the role of the current access router 514 is further reduced by allotting some of its functionality to the mobile proxy server 524. Initially, the mobile node 111 generates the application context information, and transfers it to the mobile proxy server 524, as already described earlier. The mobile proxy server 524 also stores the received information, in addition to the collected and stored information on the access routers, including the information on the neighbouring relationships of the access routers. Based on the information stored in the mobile proxy server 524, and the updating information continually arriving at it, the mobile proxy server 524 may generate the application context information and, instead of delivering it to the current access router, send it directly to the potential new access router 522. Referring to FIG. 6, this means that steps 6-1 to 6-4 are replaced by a single step, which illustrates the transfer of application context information from the mobile proxy server 524 to the potential new access router 522. Furthermore, the mobile proxy server 524 may include appropriate security measures therein to facilitate at least authentication of the source of the application context information. The mobile proxy server may also determine the time of triggering the application context information transfer, or the triggering may still be issued by the mobile node itself. This embodiment brings in an additional advantage by compiling the responsibility for the relocation activities more comprehensively into one element in the network side. The solution enhances information distribution, especially because it reduces communication over the air interface and therefore has less restrictions by the limited radio resource. Additionally, the centralized approach that comprises an essentially dedicated server facilitates more advanced and complicated routines for data distribution and target access router selection.

Figure 7:
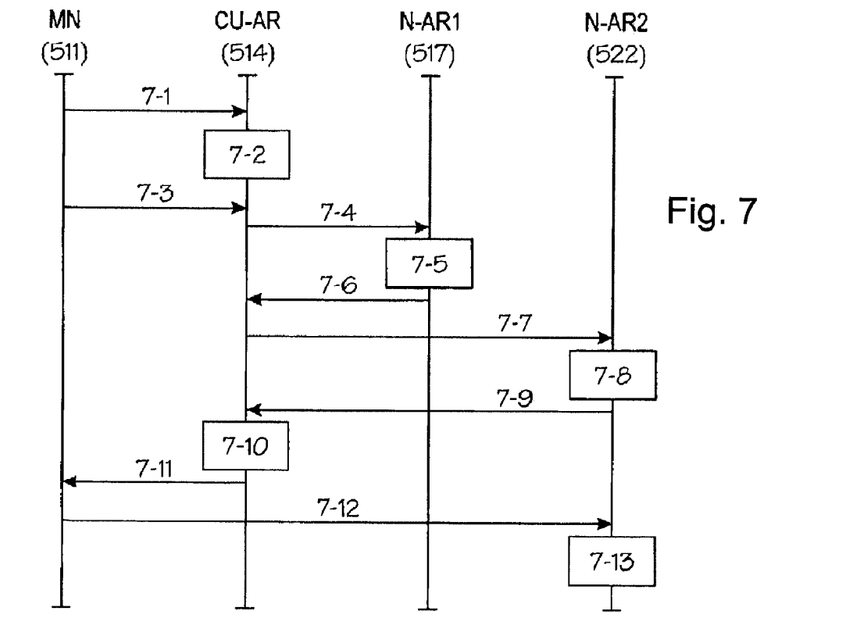
FIG. 7 shows a flow chart illustrating information transfer in a further embodiment of the invention.

A further embodiment of the invention, where the proactive procedures are utilized in selection of target access router, is described by referring to FIG. 7, and also to the architecture of FIG. 5. The availability of resources is naturally one of the essential handover criteria in access network level mobility management. The embodied target access router selection aims at solutions where the access network level criteria are only part of the overall handover criteria, and where especially the interruption by the IP layer handover to the ongoing session between the mobile node and the application server is minimized. In the embodiment, it is assumed that the functionality for target access router selection, hereinafter called as selection module, is located in the current access router. The selection module can be correspondingly implemented in the mobile node 511 or in any applicable network node, also including elements like the mobile proxy server 524 as described earlier. Adjustment of embodied information transfer according to the different locations of the TAR selection module is obvious to a person skilled in the art. Steps 7-1 to 7-4 correspond to the steps 2-1 to 2-4 and will not be re-explained here. Let us, however, assume that the transferred context information 7-4 comprises a requirement on a defined bandwidth for the ongoing application. In step 7-5, the first potential next access router 517 analyses the application context information and detects that the requested bandwidth matches its capability set, but that due to heavy temporary network load such a bandwidth is not presently available for the mobile node 511. The first potential next access router 517 sends back to the current access router 514 a message (step 7-6) that indicates the incapability of this potential next access router to reserve the requested resource for the mobile node.

The selection module in the current access router 514 is configured to transfer (step 7-7) the application context information with the requirement on bandwidth for the ongoing application to potential next access routers until it detects that none of the potential next access routers is capable of providing the requested resource. In the example of FIG. 7, the application context information is transferred to a second potential next access router 522. The second potential next access router 522 analyses (step 7-8) the received application context information and detects that the requested bandwidth matches its capability set and that such a bandwidth is presently available for the mobile node. The second potential next access router 522 sends back to the current access router 514 a message (step 7-9) that indicates the capability of this potential next access router to reserve the requested resource for the mobile node. Based on this, and potentially some other decision criteria, the selection module in the current access router 514 determines the second potential next access router 522 to be the target access router (step 7-10) and indicates this to the mobile node (step 7-11). In step 7-12, the mobile node sends a commitment message to the access router that has been selected as a target access router, corresponding to step 2-6 of FIG. 2, and in step 7-13, the target access router implements the handover actions still possibly pending, essentially such handover procedures related to actual commitment that have not yet been pro-actively implemented.

The described information transfer is only one example of the embodied solution. It is clear that, as shown, the requirements for resources can be included in one message, or the communication related to transferring the resource related requirements to the target access router may comprise several consecutive resource reservation messages. Examples of the first alternative include appropriate ICMP or UDP messages, and an example of the latter alternative is resource reservation protocol (RSVP), or the like. However, any applicable message format is possible. Depending on the location of the selection module, the choice for the possible or optimal message format may vary.

If none of the potential next access routers returns a positive response to the request for resource allocation, the selection module for target access router selection may initiate an error procedure. Such error procedure may, for example, comprise a notification to the user. The error procedure may also comprise reduction of the requirement and repetition of the attempt for pro-active resource allocation with the reduced requirement level.

Figure 8:
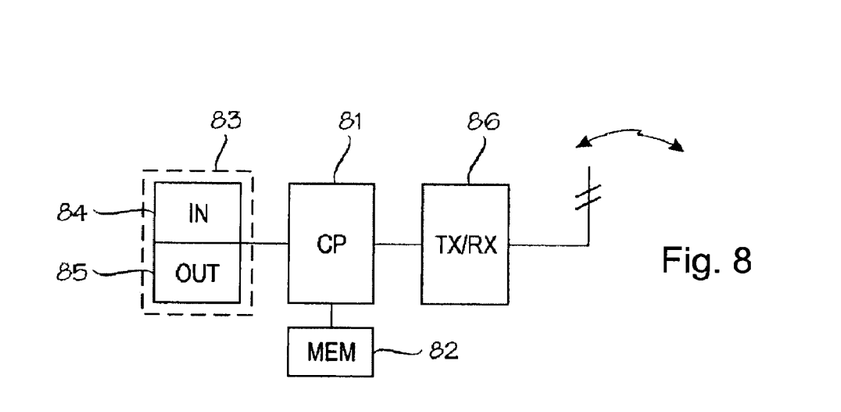
FIG. 8 shows a logical functional structure of a mobile node.

Hereinafter, reference is made to a more detailed functional description of the mobile node by referring to FIG. 8. The mobile node 111 comprises processing means 81, an element that comprises an arithmetic logic unit, a number of special registers and control circuits. Connected to the processing means are memory means 82, a data medium where computerreadable data or programs or user data can be stored. The memory means typically comprise memory units that allow both reading and writing (RAM), and a memory whose contents can only be read (ROM). The mobile node also comprises an interface block 83 with input means 84 for inputting data by the user for internal processing in the unit, and output means 85 for outputting user data from the internal processes of the unit. Examples of said input means comprise a keypad, or a touch screen, a microphone, or the like. Examples of said output means comprise a screen, a touch screen, a loudspeaker, or the like. The mobile node also comprises a radio unit 86 that is connected to the central processing means, and configured with receiving means for receiving information from the air interface and processing it for inputting to the processing means 81, as well as with transmitting means for receiving information from the processing means 81, and processing it for sending via the air interface. The implementation of such a radio unit is generally known to a person skilled in the art. The processing means 81, memory means 82, interface block 83, and radio unit 86 are electrically interconnected for performing systematic execution of operations on the received and/or stored data according to the predefined, essentially programmed processes of the unit. In a solution according to the invention, the operations comprise the functionality of the mobile node as described above.

Figure 9:
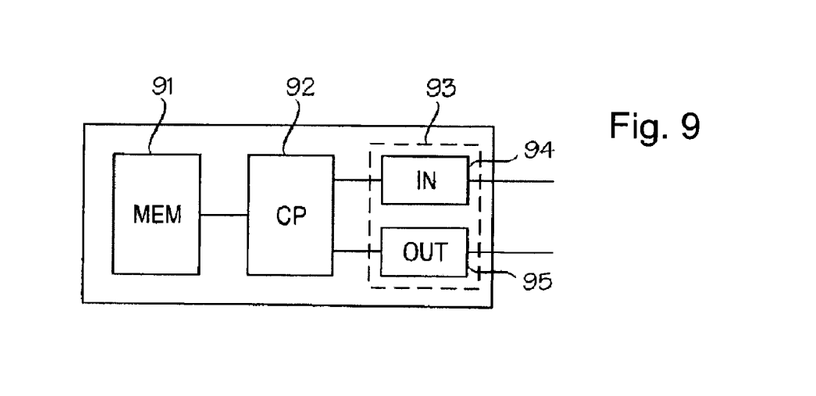
FIG. 9 shows a logical functional structure of a network node.

Correspondingly, FIG. 9 schematically illustrates the basic functional structure of a network node of the communications system as discussed above. Such nodes are referred above, for example, as access points, current access routers, potential next access routers, target access routers, and mobile proxy servers. The network node comprises processing means 91, an element that comprises an arithmetic logic unit, a number of special registers and control circuits. Connected to the processing means are memory means 92, a data medium where computer-readable data or programs or user data can be stored. The memory means typically comprise memory units that allow both reading and writing (RAM), and a memory whose contents can only be read (ROM). The unit also comprises an interface block 93 with input means 94 for inputting data for internal processing in the unit, and output means 95 for outputting data from the internal processes of the unit. Examples of said input means comprise a plug-in unit acting as a gateway for the information delivered to its external connection points. For receiving information on the operator of the network node, the network node may also comprise a keypad, or a touch screen, a microphone, or the like. Examples of said output means include a plug-in unit feeding information to the lines connected to its external connection points. For outputting information to the operator of the network node, it may also comprise a screen, a touch screen, a loudspeaker, or the like. The processing means 91, memory means 92, and interface block 93 are electrically interconnected for performing systematic execution of operations on the received and/or stored data according to the predefined, essentially programmed processes of the unit. In a solution according to the invention, the operations comprise a functionality for implementing the operations as described above.

It will be obvious to a person skilled in the art that as technology advances, the inventive concept can be implemented in various ways. The invention and its embodiments are not limited to the examples described above but may vary within the scope of the claims.

What is claimed is:

1. A method for supporting relocation of an Internet Protocol session during a network layer handover in a mobile communication system, the method comprising:
   sending application context information from a first device to a second device, the application context information indicating activities to be executed pro-actively before a network layer handover and including a requested communication requirement, wherein the application context information includes information on a current state of the Internet Protocol session and facilitates the relocation of the Internet Protocol session;
   receiving a first message from the second device at the first device, the first message including a first indicator indicating whether or not the second device can satisfy the requested communication requirement;
   in response to the first indicator indicating that the second device cannot satisfy the requested communication requirement, sending the application context information from the first device to a third device and receiving a second message from the third device at the first device, the second message including a second indicator indicating whether or not the third device can satisfy the requested communication requirement; and
   in response to the second indicator indicating that the third device can satisfy the requested communication requirement, selecting the third device as a target access router for the network layer handover.

2. The method of claim 1, wherein the first device is a current access router.

3. The method of claim 2, further comprising, before sending the application context information from the first device to the second device, receiving a message from a mobile node at the first device, the message including a request to forward the application context information to a next access router.

4. The method of claim 3; wherein the received message further includes an indicator that the next access router is the second device.

5. The method of claim 2, further comprising receiving the application context information from a mobile node at the first device.

6. The method of claim 5, farther comprising, if the second indicator indicates that the third device can satisfy the requested communication requirement, sending an indicator of the selected third device to the mobile node.

7. The method of claim 5, further comprising, if the first indicator indicates that the second device can satisfy the requested communication requirement, sending an indicator of the selected third device to the mobile node.

8. The method of claim 1, wherein the second message further includes a request for additional handover information.

9. The method of claim 1, wherein the first device is a mobile node.

10. The method of claim 9, further comprising, if the first indicator indicates that the second device can satisfy the requested communication requirement, sending a commitment message to the second device, the commitment message confirming an intent to initiate communication with the second device.

11. The method of claim 10, wherein the commitment message is sent before the network layer handover to the second device.

12. The method of claim 9, further comprising, if the second indicator indicates that the third device can satisfy the requested communication requirement, sending a commitment message to the third device, the commitment message confirming an intent to initiate communication with the third device.

13. The method of claim 1, wherein the first device is a mobile proxy server.

14. The method of claim 1, wherein the activities to be executed pro-actively before the initiation of the network layer handover comprise allocation of a network resource.

15. The method of claim 1, wherein the requested communication requirement comprises a defined amount of a network resource.

16. The method of claim 1, wherein a validity time parameter is associated with the application context information, the method further comprising determining if the application context information is valid before sending the application context information from the first device to the second device.

17. The method of claim 16, further comprising, if the application context information is determined not to be valid, sending a request to a fourth device from the first device, the request requesting updated application context information from the fourth device.

18. The method of claim 1, further comprising, if the second indicator indicates that the third device cannot satisfy, the requested communication requirement, initiating an error procedure at the first device.

19. The method of claim 18, wherein the error procedure comprises a reduction in the requested communication requirement.

20. The method of claim 1, wherein a determination of whether the second device can satisfy the requested communication requirement is made at the second device, and wherein the determination is communicated to the first device via the first indicator.

21. A device comprising:
   an output interface configured to send application context information to a second device, the application context information indicating activities to be executed pro-actively before a network layer handover and including a requested communication requirement, wherein the application context information includes information on a current state of an Internet Protocol session and facilitates relocation of the Internet Protocol session;
   an input interface configured to:
   receive a first message from the second device, the first message including a first indicator indicating whether or not the second device can satisfy the requested communication requirement; and
   a processor operably coupled to the output interface and the input interface and configured to execute a computer-readable program configured to cause the device, in response to the first indicator indicating that the second device cannot satisfy the requested communication requirement,
   to send the application context information to a third device, the second message including a second indicator indicating whether or not the third device can satisfy the requested communication requirement;
   wherein the input interface is further configured to receive a second message from the third device, the second message including a second indicator indicating whether or not the third device can satisfy the requested communication requirement; and
   wherein the processor is further configured to select the third device as a target access router for the network layer handover in response to the second indicator indicating that the third device can satisfy the requested communication requirement.

22. A non-transitory computer-readable medium having instructions stored thereon, the instructions comprising:

instructions to send application context information to a second device, the application context information indicating activities to be executed pro-actively before a network layer handover and including a requested communication requirement, wherein the application context information includes information on a current state of an Internet Protocol session and facilitates relocation of the Internet Protocol session;

instructions to receive a first message from the second device, the first message including a first indicator indicating whether or not the second device can satisfy the requested communication requirement;

instructions to, in response to the first indicator indicating that the second device cannot satisfy the requested communication requirement, send the application context information to a third device and process a second message received from the third device, the second message including a second indicator indicating whether or not the third device can satisfy the requested communication requirement; and instructions to, in response to the second indicator indicating that the third device can satisfy the requested communication requirement, select the third device as a target access router for the network layer handover.

* * * * *

UNITED STATES PATENT AND TRADEMARK OFFICE
CERTIFICATE OF CORRECTION

PATENT NO.       : 8,305,992 B2                                    Page 1 of 1
APPLICATION NO.  : 12/127929
DATED            : November 6, 2012
INVENTOR(S)      : Trossen It is certified that error appears in the above-identified patent and that said Letters Patent is hereby corrected as shown below:

On Page 2, in Field (56), under "OTHER PUBLICATIONS", in Column 2, Line 5, delete "et al," and insert -- et al., --, therefor.

In Column 2, Line 23, delete "reestablishing" and insert -- re-establishing --, therefor.

In Column 2, Line 26, delete "a the" and insert -- at the --, therefor.

In Column 3, Line 51, delete "interact" and insert -- internet --, therefor.

In Column 14, Line 7, delete "computerreadable" and insert -- computer-readable --, therefor.

In Column 15, Line 38, in Claim 4, delete "3;" and insert -- 3 --, therefor.

In Column 15, Line 44, in Claim 6, delete "farther" and insert -- further --, therefor.

In Column 16, Line 25, in Claim 18, delete "satisfy," and insert -- satisfy --, therefor.

Signed and Sealed this
Second Day of April, 2013

Teresa Stanek Rea
*Acting Director of the United States Patent and Trademark Office*